(12) United States Patent
Ettlinger

(10) Patent No.: US 6,595,382 B2
(45) Date of Patent: Jul. 22, 2003

(54) STORAGE CONTAINER FOR CRYOGENIC LIQUIDS AND METHODS OF MAKING SAME

(75) Inventor: Erich Ettlinger, Oberhaching (DE)

(73) Assignee: Linde Aktiengesellschaft, Wiesbaden (DE)

( * ) Notice: Subject to any disclaimer, the term of this patent is extended or adjusted under 35 U.S.C. 154(b) by 0 days.

(21) Appl. No.: 09/790,556

(22) Filed: Feb. 23, 2001

(65) Prior Publication Data
US 2001/0019061 A1 Sep. 6, 2001

(30) Foreign Application Priority Data
Feb. 25, 2000 (DE) .......................... 100 08 985

(51) Int. Cl.⁷ .............................................. B65D 88/12
(52) U.S. Cl. ................... 220/560.11; 220/560.1; 220/563; 220/562
(58) Field of Search .................. 220/563, 564, 220/560.1, 560.11, 476, 918, 592.27, 592, 585, 560.04, 560.07, 560.12, 562, 651, 653

(56) References Cited

U.S. PATENT DOCUMENTS

| | | | |
|---|---|---|---|
| 3,122,259 A | * | 2/1964 | Meesen |
| 3,221,916 A | * | 12/1965 | Rysgaard |
| 3,282,459 A | * | 11/1966 | Wilson |
| 3,460,706 A | * | 8/1969 | Hoover ..................... 220/592.2 |
| 3,905,508 A | * | 9/1975 | Hibl et al. ............. 220/560.11 |
| 4,182,254 A | * | 1/1980 | Secord ........................ 220/564 |
| 5,063,651 A | * | 11/1991 | Kneip, Jr. et al. ....... 220/592.27 |
| 5,263,604 A | * | 11/1993 | Metz ........................ 220/560.1 |
| 5,398,839 A | * | 3/1995 | Kleyn ......................... 220/564 |
| 5,564,587 A | | 10/1996 | Falk et al. .................. 220/501 |
| 5,577,630 A | | 11/1996 | Blair et al. ................. 220/581 |

FOREIGN PATENT DOCUMENTS

| | | |
|---|---|---|
| DE | 29 31 947 | 2/1981 |
| DE | 197 49 950 | 5/1999 |
| DE | 198 37 886 | 2/2000 |
| DE | 692 29 803 | 4/2000 |

* cited by examiner

Primary Examiner—Stephen Castellano
(74) Attorney, Agent, or Firm—Crowell & Moring LLP

(57) ABSTRACT

A storage container for cryogenic liquids has an outer container and at least one inner container, an insulation space being situated between the outer container and the inner container or containers. The outer container and/or the inner container have devices for strengthening the container walls. The devices for strengthening the container wall of the outer container and/or of the inner container are constructed as at least one web arranged on the container wall of the outer container and/or of the inner container and/or as at least one supporting plate adapted essentially to the cross-section of the inner container.

1 Claim, 2 Drawing Sheets

STORAGE CONTAINER FOR CRYOGENIC LIQUIDS AND METHODS OF MAKING SAME

BACKGROUND AND SUMMARY OF THE INVENTION

This application claims the priority of German Patent Document 100 08 985.2, filed Feb. 25, 2000, the disclosure of which is expressly incorporated by reference herein.

The invention relates to a storage container, particularly for cryogenic liquids, having an outer and at least one inner container, an insulation space being situated between the outer and the inner container or containers.

Furthermore, the invention relates to preferred uses of such a storage container.

Industrial gases, such as helium, hydrogen, nitrogen, oxygen or LNG (Liquid Natural Gas), are frequently stored or transported in storage containers in the liquid state of aggregation. As a rule, such storage containers have a double-walled construction, the liquified gas being stored in the inner container. The space between the outer and the inner container is as a rule evacuated for the purpose of insulation.

Because of this vacuum insulation, high forces act upon the inner container, particularly when storing the liquid gas at an increased pressure, as well as upon the outer container, which forces, if the storage container is constructed with plane lateral surfaces, require large wall thicknesses. This was the reason why storage containers of this type so far have usually had a cylindrical or spherical construction.

Hydrogen and liquid natural gas are increasingly used as fuel for vehicles, boats or airplanes. In these cases, the storage preferably takes place in a liquid form in the above-described storage container constructions. However, cylindrically shaped storage containers, as a rule, are difficult to adapt to the vehicle geometry. Thus, for example, in the case of the so-called low-floor buses which are used particularly in local transportation, the required storage containers are to be arranged in the upper area of the vehicle or on the vehicle roof. This requires large-surface storage container constructions which are as low as possible.

From German Patent Document DE-A-198 37 886, a storage container of the above-mentioned type for cryogenic media is known, in the case of which the forces acting upon the outer container and/or the inner container or containers are absorbed by one or several supports, these supports being arranged such that they do not contribute to the heat conduction between the inner container or containers and the outer container.

However, this construction has the disadvantage that, because of the constructively comparatively high-expenditure design of the inner container or containers, the application of the superinsulation, which is used as a rule, to the inner container or containers would require very high expenditures. The above-mentioned superinsulation is used for reducing the heat radiation onto the inner container or containers.

It is an object of the present invention to provide a storage container of the above-mentioned type which avoids the indicated disadvantages and whose geometry and design can be adapted to the respective given space conditions. In addition, the weight of the storage container as well as its wall thicknesses are to be optimized.

According to the invention, this object is achieved in that the outer and/or the inner container have devices for strengthening the container walls.

In this case, the devices for strengthening the container wall of the outer and/or inner container may be constructed, for example, as at least one web which is arranged on the container wall of the outer and/or inner container. Such webs permit a reinforcement and thus a strengthening of the container wall, so that the wall thickness can be reduced.

As an alternative or in addition, the devices for strengthening the container wall of the inner container are constructed as at least one supporting plate adapted essentially to the cross-section of the inner container. In this case, the supporting plate or plates preferably has/have openings.

These supporting plates are used not only for reinforcing or strengthening the containers, they also reduce the sloshing of the liquid situated in the inner container or containers.

When using the above-mentioned devices for strengthening the container wall, almost arbitrary storage container designs can now be implemented. Thus, storage containers, in the case of which the outer and/or the inner container has a flat cross-section can also be considered. Particularly this form of storage container, because of the optimal space utilization, is advantageous for an installation of the storage container according to the invention in passenger cars and busses.

As a further development of the storage container according to the invention, it is suggested that at last one support for increasing the stability of the inner and/or outer container is provided, the support not establishing a heat-conducting connection between the outer and the inner container.

The supports are in contact either only with the outer container or only with the inner container or containers. Therefore, the supports definitely do not connect an inner container with an outer container. A feeding of heat into the inner container by way of the heat conduction by the supports or by one of the supports is therefore definitely excluded.

If only an inner container is provided, the supports preferably connect opposite walls of the inner container in order to compensate the tensile forces caused by the vacuum surrounding the inner container. Analogously, the supports stabilizing the outer container are also preferably arranged between opposite walls of this container. In the case of several inner containers, the supports can be provided either inside a container or can surround the container in the form of a stabilizing structure. It is also conceivable that the supports are used for supporting the inner containers with respect to one another. Corresponding to this arrangement, the supports are designed either for the absorption of tensile or pressure forces.

In order to be able to store a large quantity of cryogenic liquid, it is advantageous to adapt the shape of the inner container to that of the outer container in order to utilize the available space as completely as possible. However, an insulation space should remain between the outer and the inner container. As a rule, supports should therefore be provided for the outer and the inner container. In such a construction, the inner container has passages or recesses for the supports of the outer container, which achieves that the supports of the outer container cannot come in a heat-conducting contact with the inner container.

An advantageous further development of the storage container according to the invention is characterized in that more than one inner container are surrounded by the outer container.

From a constructive point of view, it is often expedient to provide not only one but several inner containers in a common outer container. In this case, the design and the size of the individual inner containers are advantageously adapted to the design of the outer container such that its volume can be optimally utilized. The use of several inner containers has several advantages. Thus, standard containers, such as cylinders, can be used, and generally the geometry and the design of the inner containers can be selected more freely.

If several inner containers are provided, corresponding to another advantageous further development of the storage container according to the invention, these are constructed to be mutually connected and/or connectable on the liquid side and/or gas side. When this further development is implemented in this manner, for example, only a single level indicator or only one pressure gauge is required for all inner containers.

The storage container according to the invention is suitable particularly for the storage of liquid hydrogen ($LH_2$) liquid oxygen ($LO_2$), liquid nitrogen ($LN_2$) liquid helium (LHe) as well as liquid natural gas. However, the storage container according to the invention is advantageous not only for storing cold media, but also for storing warm or hot media. The storage container according to the invention can advantageously always be used when a clear temperature difference exists between the medium to be stored—whether it is liquid and/or gaseous—and the environment. The high adaptability of the storage container to many different space conditions is advantageous particularly when these storage containers are used in vehicles, particularly land vehicles.

The use of the storage container according to the invention is particularly expedient when storing liquids at a pressure of more than 3 bar, particularly at a pressure of between 3 and 8 bar.

Other objects, advantages and novel features of the present invention will become apparent from the following detailed description of the invention when considered in conjunction with the accompanying drawings.

DETAILED DESCRIPTION OF THE DRAWINGS

Figure 1:
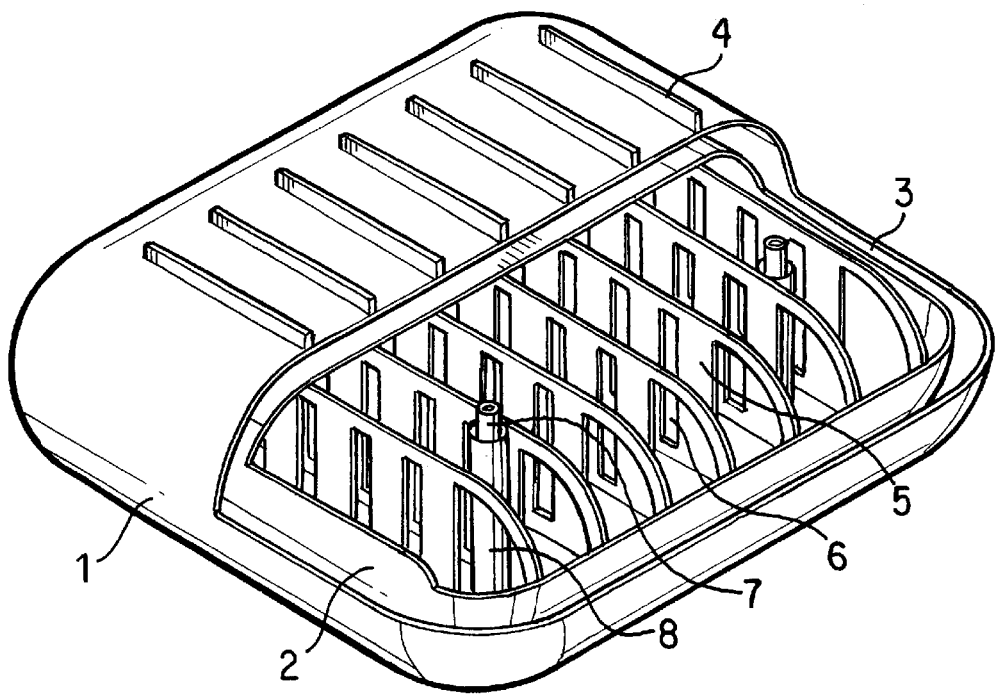
FIG. 1 is a perspective part sectional view of a first embodiment of a storage container constructed according to the invention.
Figure 2:
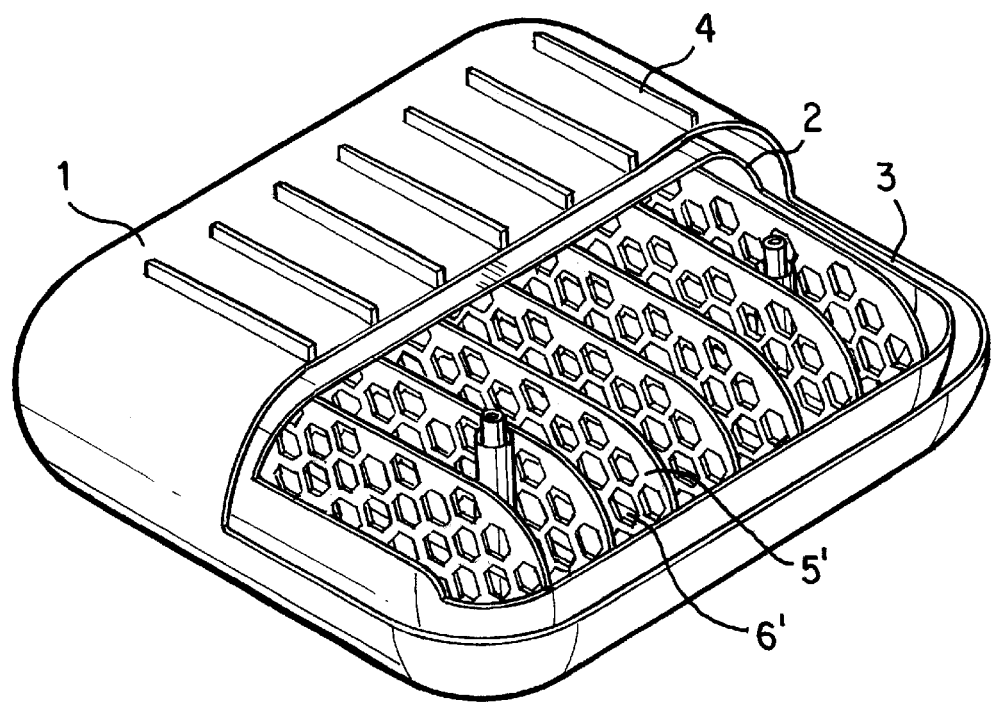
FIG. 2 is a perspective (partial) sectional view of a second embodiment of the storage container according to the invention.

FIGS. 1 and 2 show a storage container as it is used, for example, in passenger cars and/or buses for storing liquid hydrogen or liquid natural gas as fuel. The flat shape of the storage container is particularly suitable for an arrangement in the upper bus area, on the roof of a bus or generally on vehicle roofs and/or in a passenger car.

Because of their shape, such storage containers are also called flat tanks. Particularly this design of the storage container permits a comparatively simple application of the above-mentioned superinsulation and, furthermore, a cost-effective series production of the storage container.

The storage container consists of an outer container 1 as well as an inner container 2 arranged therein. Between the outer container 1 and the inner container 2, an insulation space 3 is situated which, as a rule, is vacuum-insulated but can also be filled with pearlite or another insulation material. For reasons of clarity, no filling and removal line(s) is or are illustrated in FIGS. 1 and 2.

The inner container has a capacity of approximately 100 liters. The dimensions of the outer container are approximately 80 cm×90 cm×30 cm (depth×length×height). However, by means of such a design of the storage container, also capacities of up to 1,000 liters and more can be realized.

According to the invention, several webs 4 are now arranged parallel to one another on the container wall of the outer container 1. These webs 4 prevent that the container wall of the outer container 1 can be deformed inward by the tensile forces caused by the vacuum in the insulation space.

The inner container 2 has several supporting plates 5 and 5' which are adapted to its cross-section and are also arranged parallel to one another. The supporting plates preferably consist of special steel and are welded to the container wall of the inner container 2. They have differently shaped openings 6 and 6'.

The shape of the openings 6 illustrated in FIG. 1 is particularly suitable in storage containers which are designed for higher pressures, while the shape of the openings 6' illustrated in FIG. 2 can be used in the case of storage containers designed for lower pressures.

For supporting the outer container 1, supports 7 are additionally provided. These supports 7 are braced between two opposite walls of the outer container 1 and form no heat-conducting connection to the inner container 2. In this case, the supports extend through corresponding passages provided on the inner container 2.

Figure 3:
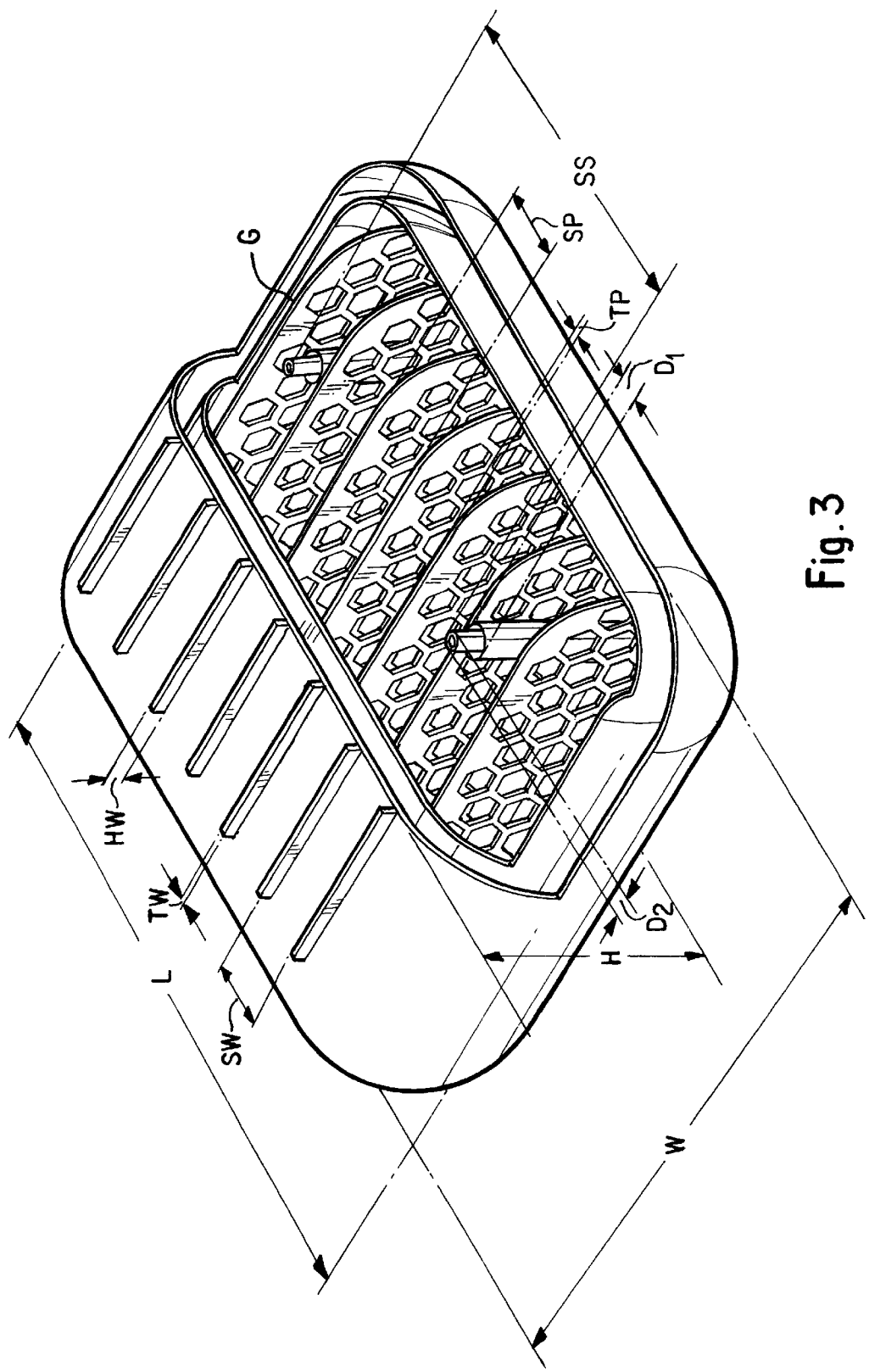
FIG. 3 is a perspective part sectional view of the embodiment of FIG. 2, showing exemplary dimensions.

FIG. 3 is a perspective part sectional view schematically depicting dimensional features of preferred embodiments of the invention. The following dimensions are depicted:

L=overall length of the outer container 1
W=overall width of the outer container 1
H=height of the outer container 1
G=gap between the inner and outer containers
Tp=thickness of the supporting plates 5'
Sp=spacing between the supporting plates 5'
Tw=thickness of webs 4
Hw=height of webs 4
Sw=spacing between webs 4
$D_1$=diameter of supports 7 along portions inside the inner container 2
$D_2$=diameter of supports 7 along portions in gap between the inner and outer containers
Ss=spacing between supports 7

Exemplary dimensions for a preferred embodiment of an approximately 100 liter tank (inner tank) are as follows:

L=890 mm
W=800 mm
H=300 mm
G=5 mm
Tp=3 mm
Sp=97 mm
Tw=7 mm
Hw=10 mm
Sw=93 mm
$D_1$=40 mm
$D_2$=20 mm
Ss=445 mm

Exemplary ranges of these dimensions would be the above-listed dimension plus or minus 10%. For larger or smaller tanks, the dimensions would be correspondingly increased or decreased and with the gap G being selected to provide the requisite insulation for the cryogenic liquid to be stored.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A storage container assembly for storing cryogenic liquids, comprising:

an outer container;

an inner container disposed inside the outer container with an insulation space between facing walls of the outer and inner container;

strengthening devices on walls of at least one of the outer and inner containers, wherein said strengthening devices include a plurality of webs connected at exterior parts of the outer container walls, a plurality of flat supporting plates extending between and connected to facing walls of the inner container, and a plurality of support members which extend through the inner container and are connected at opposite ends of the support members with walls of the outer container, said support members being configured so as to provide no heat-conducting connection between the inner and outer containers, and wherein said support members are disposed between and spaced from respective ones of the supporting plates.

* * * * *